US006453269B1

(12) United States Patent
Quernemoen

(10) Patent No.: US 6,453,269 B1
(45) Date of Patent: Sep. 17, 2002

(54) METHOD OF COMPARISON FOR COMPUTER SYSTEMS AND APPARATUS THEREFOR

(75) Inventor: John M. Quernemoen, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/514,506

(22) Filed: Feb. 29, 2000

(51) Int. Cl.$^7$ ................................................ G06F 11/30
(52) U.S. Cl. .......................................... 702/186; 707/1
(58) Field of Search .............................. 702/186; 707/1, 707/200; 709/200

(56) References Cited

U.S. PATENT DOCUMENTS

| | | | |
|---|---|---|---|
| 5,065,360 A | 11/1991 | Kelly | 395/800 |
| 5,617,514 A | 4/1997 | Dolby et al. | 395/51 |
| 5,630,025 A | 5/1997 | Dolby et al. | 395/51 |
| 5,701,471 A | * 12/1997 | Subramanyam | 707/1 |
| 6,052,694 A | * 4/2000 | Bromberg | 707/2 |
| 6,219,654 B1 | * 4/2001 | Ruffin | 705/10 |
| 6,249,769 B1 | * 6/2001 | Ruffin et al. | 705/10 |
| 6,260,020 B1 | * 7/2001 | Ruffin et al. | 705/1 |

OTHER PUBLICATIONS

Internet Web page at www.tpc.org, as of Jan. 17, 2002, which refers to and discusses the Applicant–admitted well–known TPC A,B,C, H, R, and W benchmarking criteria and results.*
Giladi et al., "SPEC as a Performance Evaluation Measure", IEEE, 1995.*
Compaq Computer Corporation, "White Paper", 5 pages, Jun. 1998.
Kim Shanely, "History and Overview of the TPC", 14 pages, Feb. 1998.
"TPC–C Results—Revision 3X", downloaded from www.tpc.org, 4 pages, dated prior to Feb. 29, 2000.
"TPC–R Benchmark", downloaded from www.tpc.org, 2 pages, dated prior to Feb. 29, 2000.
"TPC–H Benchmark", downloaded from www.tpc.org, 2 pages, dated prior to Feb. 29, 2000.
Jack Stephens, "TPC–D The Industry Standard Decision Support Benchmark", 28 pages, dated prior to Feb. 29, 2000.
Select pages from www.tpc.org, 12 pages, downloaded Nov. 2, 1999.
User Guide, Compaq System Sizer v8.1 for Oracle8i NT4.0, Compaq Computer Corporation, Jun. 1999, pp. 1–40.
User Guide, Compaq Sizer 2.30 for Microsoft SQL Server 7.0, Compaq Computer Corporation, Oct. 1999, pp. 1–44.
"TPC–D Benchmark", downloaded from www.tpc.org, 6 pages, dated prior to Feb. 29, 2000.

* cited by examiner

*Primary Examiner*—Patrick Assouad
(74) *Attorney, Agent, or Firm*—Charles A. Johnson; Mark T. Starr; Crompton, Seager & Tufte, LLC

(57) ABSTRACT

A computerized method is disclosed which aids in the comparison of different computer systems according to their performance parameters under established or proprietary benchmark performance tables or databases. The method, particularly when implemented in executable code, allows system planners to conveniently make an accurate decision about what computer system will most efficiently meet their computing needs. System planners may also determine how much money is required for a marginal increase in performance. In this way, a system planner may consider whether the additional expenditures required to increase power or capacity across vendors results in a cost-effective increase, when compared against a less powerful but less expensive system.

29 Claims, 6 Drawing Sheets

FIG. 5

These results are valid as of date 2/17/2000 11:51:57 AM

TPC-C BENCHMARK RESULTS

TPC-C Results - Revision 3.X

| Company | System | Spec. Revision | tpmC | $/tpmC |
|---------|--------|----------------|------|--------|
| ALR | Revolution 6X6 (1MB L2) (c/s) | 3.3 | 13089.3 | 35.44 |
| ALR | ALR Revolution 6X6 c/s | 3.3 | 10665.53 | 48.1 |
| ALR | Revolution Quad6 SD512 c/s | 3.2 | 7407.05 | 57.78 |
| Acer | AcerAltos 21000 c/s | 3.5 | 23235.57 | 16.66 |
| Acer | AcerAltos 19000Pro4 (c/s) | 3.3 | 11072.07 | 27.25 |
| Amdahl | EnVista Frontline Server | 3.2 | 7573 | 78.43 |
| Bull | EPC 440 c/s | 3.5 | 17133.7 | 68.2 |
| Bull | Escala EPC 2400 c/s | 3.5 | 135815.7 | 54.94 |
| Bull | Express5800 HV8000 (c/s) | 3.3 | 16216.1 | 39.69 |
| Bull | ESCALA Power Cluster P4404-HE c/s | 3.2 | 14285.87 | 235.02 |
| Bull | ESCALA D404/8 c/s | 3.2 | 7303.67 | 195.68 |
| Bull | ESCALA D404/8 c/s | 3 | 4925.02 | 230.33 |
| Bull | ESCALA D401/8 c/s | 3 | 3512.97 | 269.47 |
| Bull | ESCALA Deskside D201/4 C/S | 3 | 1562.93 | 549.14 |

METHOD OF COMPARISON FOR COMPUTER SYSTEMS AND APPARATUS THEREFOR

RELATED APPLICATIONS

The present application is related to the following co-pending applications filed on date even herewith: U.S. application Ser. No. 09/515,308, pending filed Feb. 29, 2000, entitled DATABASE SIZER FOR NT SIZER SYSTEM; U.S. application Ser. No. 09/515,310, filed Feb. 29, 2000, entitled SIZING SERVERS FOR DATABASE MANAGEMENT SYSTEMS VIA USER DEFINED WORKLOADS; U.S. application Ser. No. 09/515,158, pending filed Feb. 29, 2000, entitled titled BUILT IN HEADROOM FOR AN NT SYSTEM SIZER; U.S. application Ser. No. 09/516,272, pending filed Feb. 29, 2000, entitled ALGORITHM TO CALCULATE MASS STORAGE REQUIREMENTS FOR NT SIZER; and U.S. application Ser. No. 09/514,801, pending filed Feb. 29, 2000, entitled COMBINATION OF MASS STORAGE SIZER, COMPARATOR, OLTP USER DEFINED WORKLOAD SIZER, AND DESIGN. All of the aforementioned co-pending patent applications are hereby incorporated by reference.

FIELD OF THE INVENTION

The present invention is related generally to software and computer programs. More specifically, the present invention is related to software for sizing and specifying database management system hardware.

BACKGROUND OF THE INVENTION

Businesses and other organizations implementing computer systems, and specifically database management systems (DBMS), and relational database management systems (RDBMS), have naturally been interested in obtaining some measure of the performance of systems they are considering, to enable comparison shopping among competing systems. This interest extends both to the hardware systems available for their database system, for example, its speed and capacity, and to the commercial software systems available to run on the hardware systems. The desire to have some objective measure of the performance of a system, and how this system performs relative to competing systems, is natural in view of the competing claims made by different hardware and software vendors. Not only is the conflicting "puffing" of sales representatives not helpful to the purchasing decision, but even seemingly objective measures of a system's capabilities may be influenced by the tests that a vendor uses to demonstrate their system. In other words, vendors will tend to use demonstration or evaluation criteria that emphasize their product's strong points, and downplay or minimize areas in which their system is weaker than their competitors'.

Several benchmark standards have been proposed, in order to provide a relatively level playing field with respect to the evaluation of different systems. Typically, benchmarking of database systems involves the construction of a hypothetical or example database. Predefined functions such as queries and/or updates, typically specified in the benchmark in SQL, are executed on this database using the hardware or software system being considered, and the database system must provide accurate results. If the database system gives proper output to the queries submitted, and updates the database accurately, the speed, throughput, or efficiency of the system may be analyzed. Two early benchmarks for DBMS, introduced in the 1980s, were the Wisconsin benchmark and the Debit-Credit benchmark. Subsequently, a benchmarking system named TP1 was created, which tested the ability of a DBMS to handle database functions related to cashing a check. One shortcoming of some of these early, relatively simple benchmarking systems was that it was possible for an unscrupulous vendor to 'cheat' by making insignificant changes to a hardware or software product that, while not improving the system as a whole for most real-world applications, would bring greatly improved performance on the benchmark test.

Criticisms of these early systems led to a multivendor effort to create a benchmarking system that would fairly test systems, and on which would not be possible to cheat. The multivendor efforts to create a fair benchmark led to the formation of the Transaction Processing Council, or TPC. One way that the TPC reduced a vendor's opportunity to tune its system to perform well on a specific benchmark test was to provide for random variation in certain data to be inserted into the database or in queries issued to the system. Early standards were named TPC-A, TPC-B, and TPC-C. The council has published several 'transaction processing' and 'decision support' benchmarking standards. Transaction processing benchmark specification analyze the ability of a given system to handle transactions related to, for example, individual customer's accounts, or other OLTP (on-line transaction processing) functions. Decision support benchmarking tests a system's ability to rapidly analyze entire stores of data, and return averages or transactions that have a parameter within a certain range of values. For example, a decision support benchmark database query may ask what the impact on revenue would be if sales of a certain range received a percentage discount.

More recent standards propagated by the TPC include TPC-D, TPC-H and TPC-R. The TPC results for various vendors' systems are made publicly available at the Transaction Processing Council's web site. The TPC-C benchmark, for example, has two chief parameters. The tpmC ("transactions per minute (C)") and $/tpmC ("price per transactions per minute (C)"). The tpmC metric provides a rough measure of "business throughput," representing the number of orders processed on a database system per minute. The $/tpmC represents the cost of the system for each transaction per minute. $/tpmC is derived by dividing the price of the entire system, not merely the server, by the tpmC that the system delivered in the benchmark evaluation. $/tpmC provides a measure of the "bang for the buck," or in other words, the cost of the system adjusted for differences in speed between systems.

To simulate the business activity of processing an order, the following transactions are simulated under the TPC-C benchmark: New-Order, Payment, Order-Status, Delivery, and Stock-Level. Transactions per minute (tpmC) measures the number of New Order transactions that may be processed per minute by the computer being considered.

While the TPC benchmark results provide a valuable resource for consideration of the performance of various systems, an extensive number of different systems, and different hardware and software combinations, are available and included on the TPC site. These results are voluminous, and not readily scanned by human beings to make accurate or good overall judgments about what computer system will deliver the best performance for a given price range, or deliver a desired level of performance for the best price. It is desirable, therefore, to provide a convenient environment for rapid consideration of benchmark performance across systems in order to estimate the relative performance and value of various computer systems that a system planner may be considering.

SUMMARY OF THE INVENTION

The instant invention provides an environment for the consideration of various hardware and software combinations for a DBMS, and provides for the accurate quantitative comparison of competing systems according to their benchmark performance.

In a preferred embodiment, the statistical data used in the comparison method is that published by the Transaction Processing Council. Other statistical compilations of server performance may also be used, including those by other organizations, other TPC performance criteria, proprietary statistics, statistics furnished by vendors in promoting certain equipment, etc.

In one illustrative embodiment of the present invention, a system planner is presented with an option to select a configuration for a baseline system. This is the system against which a target system's performance will be compared. The system planner first selects from a choice of operating systems. These may include common network operating systems such as Unix, Windows NT, Novell NetWare, IBM AS/xxx, etc. In the event that the system planner wishes to consider operating systems that are not specifically presented, an option may be presented for a general analysis leaving the operating system unspecified.

The system planner may also select a Database Management System (or DBMS) that is or may be used with the platform configuration selected. The system planner is preferably presented with common database software such as DB2, Informix, Oracle, SQL Server, Sybase, etc. In the event the system planner wishes to consider database software that is not specifically presented, an option may be provided for a general analysis leaving the database software unspecified. This scenario may occur, for example, when proprietary or 'in-house' database software is used, where performance data is not likely to be available.

After selection of a baseline system, the system planner is presented with the configuration options for a 'target' system. The system planner then selects the parameters of the system that will be objectively compared with the initial 'baseline' system. In one embodiment, the invention allows the system planner to easily determine which system is more cost-effective for a desired application, without having to adjust performance statistics for the cost of the computer systems involved.

It is contemplated that the present invention may prevent the system planner from comparing the benchmark data for database servers of two different sizes, when the comparison is likely to be misleading or inaccurate. Benchmark organizations often caution against considering benchmark statistics between two systems with widely disparate memory, mass storage capacity, number of processors, or processor speed. In such scenarios, the present invention may issue warnings regarding the limitations of the benchmarking data in comparing two systems with widely varying characteristics.

Likewise, it is contemplated that the present invention may prevent the system planner from comparing benchmark data or other performance statistics when the proponents of the statistics do not consider the comparison to be statistically reliable. For example, the benchmarking organization may advise that certain benchmark data may be valid for only a limited period of time. Often, improvements in hardware products or software applications where no new version number is indicated may render benchmark test data unreliable. Alternatively, or in addition to, the benchmark test itself may be disfavored in view of improved benchmark tests. In these situations, the present invention may notify the system planner of limitations in the benchmark data.

An alternate embodiment may cause a benchmarking database to expire and become inaccessible a certain length of time after it is downloaded or loaded into a computer adapted to perform the invention. This may prevent the system planner from relying on untimely data when making system planning decisions.

Once the baseline system and target system are selected, the ratios of the baseline system's performance parameter to the target system's performance parameter, and/or the ratio of the baseline system's price to performance ratio to the target system's price to performance ratio, are displayed. Preferably, these ratios are dynamically displayed as soon as any aspects of the baseline or target system are changed, so that the system planner does not have to select criteria and then resubmit the system characteristics or enter a command to recalculate the ratios based on the new criteria.

In another illustrative embodiment, the TPC-D database may be considered. For example, instead of the transactions per minute metric of the TPC-C database, a performance variable called QppD@Size may be considered. Under this metric, the relative database size is used as a scale factor to determine the population of each table in the database. A scale factor (SF) of 1, for example, corresponds to about 1 GB of raw data.

$QppD@Size=[(3600*SF)/(Q_1*Q_2* \ldots *Q_{17})*UF1*UF2]^{1/19}$, where $Q_i$=Elapsed time to run query i within a single query stream; $UF_1$=Elapsed time to run update function 1; $UF_2$=Elapsed time to run update function 2; SF=Scaling Factor. The divisor of the equation represents the geometric mean of the timing intervals, i.e., the elapsed time to run the queries of the test, plus two update functions. Because the elapsed time entries into the metric are in seconds, the complete power metric QppD@Size has units of queries per hour.

The scale factor is unitless in the equation. The 3600 figure, also without units, converts the function per second of the geometric mean of the timing intervals into the queries per hour units of the QppD@Size metric. The throughput metric of the TPC-D benchmark database, QthD@Size, is the ratio of the number of queries executed to the length of the measurement interval in seconds: QthD@Size= (N*17*3600*SF)/L; where N =the number of query streams, and L=the length of the measurement interval in seconds. The units of the QthD@Size metric are queries per hour, adjusted for the scale factor, SF, to account for differences in database size.

Generally, both of these TPC-D parameters represent the number of queries that a hardware configuration can handle per gigabyte hour. Both the QppD@Size and the QthD@Size parameters are combined with system cost to provide the cost for a given level of throughput, measured as the geometric mean of both throughput parameters: $/QphD@Size=C/(QppD@Size*QthD@Size)^{1/2}$; where C=cost of system in dollars.

In yet another embodiment of the present invention, the invention may be implemented as a platform selection computer program. Under this embodiment, the user or system planner may enter a software application to be used, for example, in accessing and updating a relational database. The system planner may then select a particular relational database management system software application, for example, an application sold under the brand Oracle™. The subject invention, implemented in an illustrative embodiment as a computer program, may then solicit from the system planner the range of performance required for the computer system that the system planner is implementing. For example, the system planner could request a list of all benchmarked systems that perform at a certain minimum number of transactions per minute (tpmC) or above. In response, the invention may supply the system planner with a report of all computer hardware systems benchmarked in a particular database, and the operating systems used with the machines, that ran the Oracle™ application at least at the performance minimum set by the system planner.

In another illustrative embodiment, the system planner may simply input a minimum performance parameter, such as a maximum price of cost per transaction per minute ($/tpmC) under the TPC-C benchmark (TPC-C). In response, the invention may return a list of all database systems that meet the system planner's specified parameters. Other embodiments of the invention may allow the system planner to input an existing hardware system and selected required parameters. In response, the invention may identify those operating system and/or software application configurations that meet the required parameters.

In a typical embodiment, the system planner interfacing with the invention will be a human user considering the purchase of a database management system. However, other embodiments are contemplated, including an embodiment where the system planner is a computer system, or is software running on the same or another computer system.

BRIEF DESCRIPTION OF THE DRAWINGS

FIG. 5 is a table of a subset of data as provided by the Transaction Processing Council (TPC), sorted by manufacturer.

DETAILED DESCRIPTION OF THE INVENTION

Figure 1:
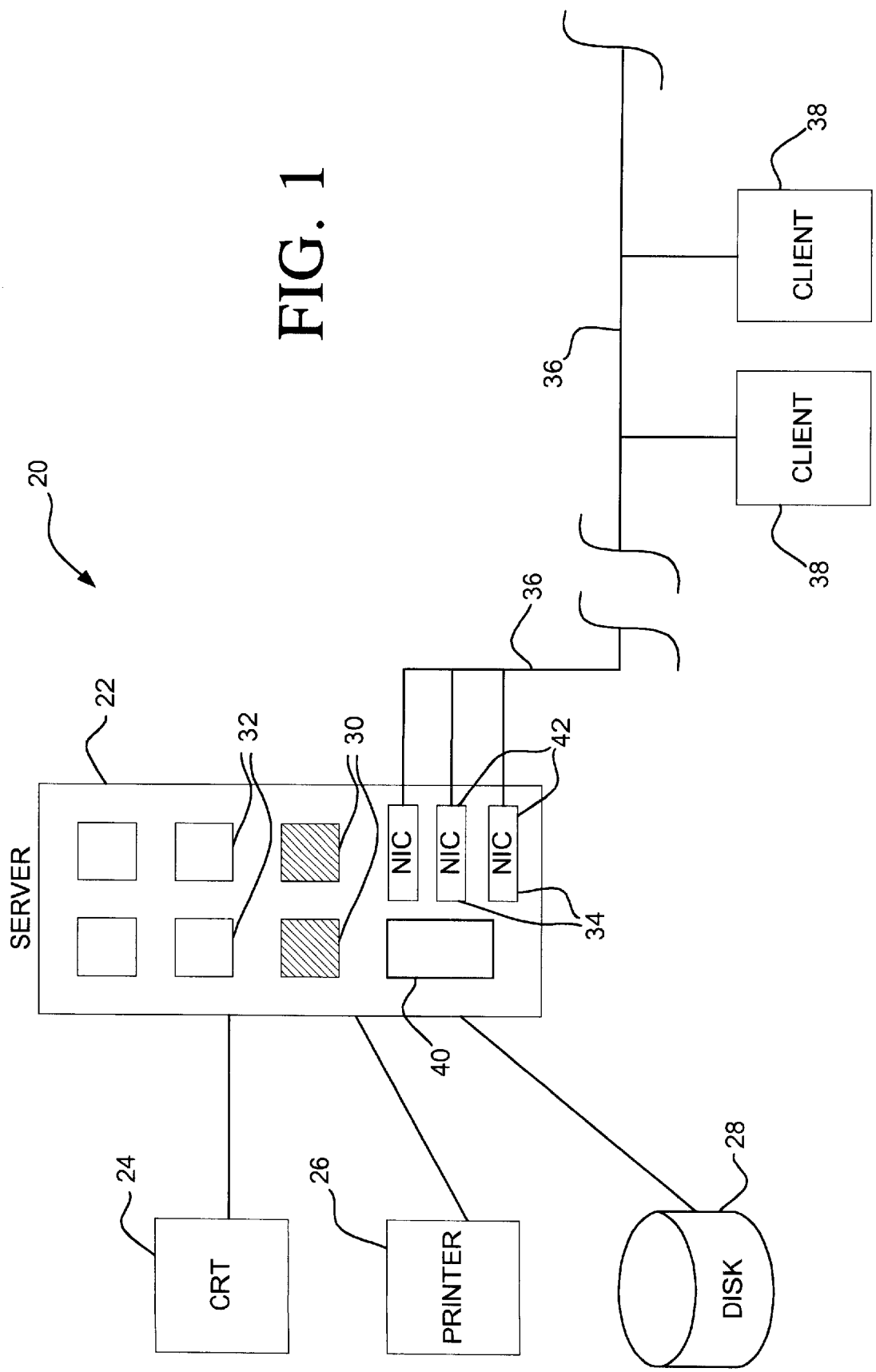
FIG. 1 is a highly diagrammatic schematic of a computer system including a database server.

FIG. 1 illustrates generally a database server system 20 including a server 22 supported by a CRT 24 and a printer 26 for programming, display, maintenance, and general Input/Output uses. Within server 22 is illustrated several CPU sockets 30 and 32, with CPU sockets 30 being populated with CPUs and CPU sockets 32 remaining empty for future expansion and population. Server 22 also includes a memory portion 40 which can contain a sufficient quantity of Random Access Memory (RAM) to meet the server's needs. A disk 28 is illustrated for mass storage, which can include disk drives or any other technology capable of holding the contents of the databases or databases to be managed. Several Network Interface Cards (NICs) 42 are illustrated as part of server 22 and are coupled to a network illustrated by a network link 36 which can be any communication link including Local Area Networks, Wide Area Networks, Ethernet, and the Internet.

Also connected to data link 36 are client computers 38. Software clients can, in fact, reside on the same machine as the server, but in common practice, the client processes usually run on a different machine. In one embodiment, server 22 is a computer running on the Microsoft NT operating system and clients 38 are smaller computers running a Microsoft Windows operating system.

Server 22 is preferably scaleable, having extra socketed capacity for memory, processors, NICs, and disk drives. This allows extra CPUs, memory, NICs, and mass storage such as disk drives to be initially set to meet current needs and later expanded to meet changing needs. Servers such as server 22 often exist to contain and manage data bases, such as those contained within relational database management systems (RDBMSs). RDBMSs include tables formed of rows or records and columns. Under an embodiment of the present invention, the comparative performance of various servers managing RDBMSs can be considered.

Figure 2:
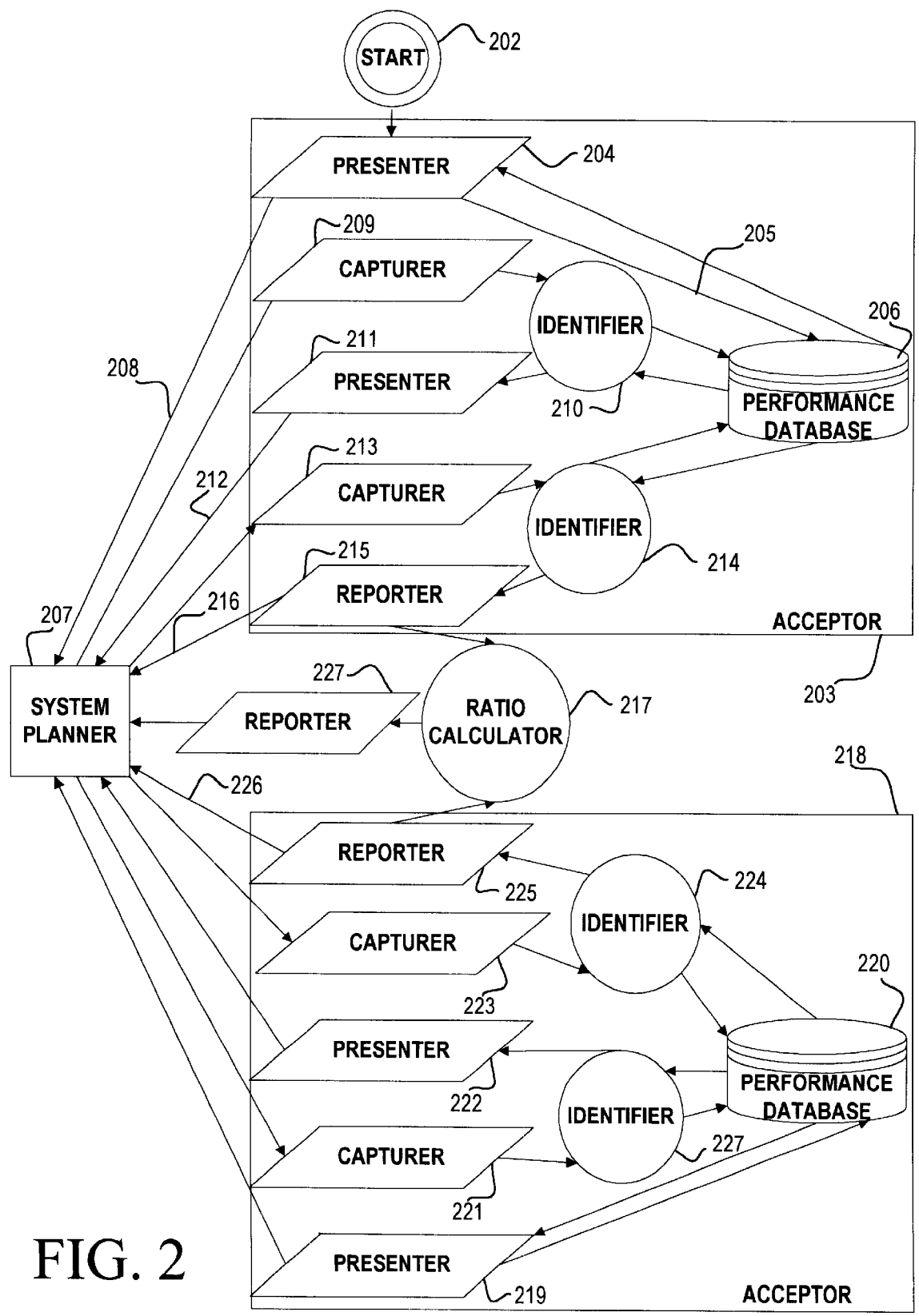
FIG. 2 is a flow diagram showing the flow of data between various components of the present invention.

FIG. 2 is an illustrative flow diagram, showing the flow of data between various components of the present invention. An illustrative software embodiment of the present invention may have similar data flows between modules or subroutines implementing the methods of the present invention. Upon initiation of the subject apparatus, indicated at 202, a first data acceptor 203 begins the baseline system selection process. Under this process, a first presenter 204 accesses, indicated by request 205, a performance database 206 containing data regarding the comparative performance of various computer systems that have various specifications and operating capacities. The first presenter 204 then distills or sorts the specifications into an array of performance specifications which are presented to the system planner 207 by message 208. The system planner may be a human user, or may alternatively be a compatible software module or apparatus. In an illustrative embodiment of the subject invention, the system parameters presented to the system planner may be various operating systems and/or software packages for which performance data have been collected. In an alternative embodiment, rather than having the first presenter 204 distill or sort the possible performance parameters of the performance database, performance specifications may be "hard-coded" into a software routine presenting these hard-coded system specifications to the user, rendering a lookup to a database unnecessary.

Upon selection by the system planner 207 of the system parameters that the system planner is interested in or has been programmed to investigate, the parameter selections are stored or saved in a first capturer 209, which in turn forwards the specification selections to an identifier 210. The identifier accesses the performance database 206, and identifies various hardware systems, for example by type or brand name, which have performance data for system specifications meeting the inquiry of the system planner 207. Any applicable systems for which performance data is available are produced by the identifier 210, and sent to the second presenter 211 for delivery to the system planner 207. The information regarding the various computer systems which meet the system planner's needs are arranged in an array or list by the second presenter 211 for forwarding by message 212 to the system planner for selection of a subset of computer systems meeting the desired specifications.

In a preferred embodiment, the system planner selects one computer system as a first or baseline system to consider for its purposes. Upon selection of a subset of the computer systems by the system planner, the second capturer 213 stores the system information, and forwards the information to a second identifier 214 for further processing.

The second identifier 214 accesses the performance database 206 for full extraction of all data pertaining to the selected systems. In an alternate embodiment, the second identifier 214 may access the required information at the first identifier 210, where the first identifier extracted all performance information from the performance database 206 for all systems which were presented to the system planner 207. In either event, the second identifier forwards all the performance data for the selected systems to the first reporter 215, for delivery to the system planner 207 in a system performance report, indicated by message 216. In addition, the second identifier gives the system performance data to a ratio calculator 217 for temporary storage. The presenters 204 and 211, as well as the capturers 209 and 213, reporters 215 and 227, ratio calculator 217, and identifiers 210 and 214, may each be separate hardware apparatus, separate software modules, separate sub-routines, or functions of the same module or routine with different calls.

A second system or set of systems are selected by the system planner in a manner similar to that of the first selection process, using the second data acceptor, 218. A third presenter 219 extracts performance specification parameters from the performance database 220. In an alternate embodiment, the system planner considers computer systems from the same performance database as those systems chosen using the first performance database 206, using the same performance fields as used in the first data acceptor 203. In this case, the third capturer 221 need only access the performance specification fields from the first presenter 204 of the first data acceptor 203, rather than extracting the performance fields from a second performance database 220.

If the same database and system performance fields are considered in using the second data acceptor as when using the first, the array of potential systems to be considered by the system planner will be identical. Accordingly, the fourth presenter 222 can deliver to the system planner 207 an array or list of systems identical to that presented to the system planner by the second presenter 211, rather than separately mining a second database 220 for system performance fields and suitable individual system records. In either event, the system planner may select a subset of systems from those presented by the fourth presenter 222. In a preferred embodiment, the number of systems in this subset will be one, and the system subset will be not identical to the subset considered in using the first data acceptor 203. Also in a preferred embodiment, the performance database 220 will be the same database as database 206 of the first acceptor, or will contain data identical to database 206.

After selection of a subset of systems for analysis, the fourth capturer 223 stores the system subset information, and forwards the information on to the fourth identifier 224 for data extraction. The fourth identifier 224 accesses the performance data for the system subset. As mentioned above, in a preferred embodiment, database 220 will be the same as database 206. Accordingly, the fourth identifier may access the relevant performance data either by mining the data from the second database 220, or in a preferred embodiment, by receiving the data directly from the second identifier 214 of the first data acceptor 203. In either case, the fourth identifier 224 forwards the performance data for the system subset to the second reporter 225 for delivery to the system planner in a system performance report, depicted by message 226.

The information is also forwarded to the ratio calculator 217, where the performance statistics for the second system subset are mathematically compared against those of the first system subset. The results of this comparison are forwarded to a third reporter, 227, which then produces a final system comparison report for delivery to the system planner 207, represented by message 228. Similar to the corresponding aspects of the first acceptor, the presenters 219 and 222, the capturers 221 and 223, the reporters 225 and 227, and the identifiers 224 and 227 of the second acceptor, may each be a separate hardware apparatus, or they may be separate software modules, or sub-routines or functions all of the same module or routine. Alternatively, all of the implementations of the various types of functions may be identical software modules with different calls or function arguments or inputs. For example, all four identifiers 210, 214, 224, and 227 may be implemented in a single software module, the function arguments defining the modules function under the data flow diagram of FIG. 2. Similarly, the set of all four presenters 204, 211, 219, and 222, all four capturers 209, 213, 221, and 223, or all three reporters 215, 225, and 227 may be embodied by generic presenter, capturer, and reporter modules, respectively.

In a preferred embodiment, the final system comparison report includes the performance statistics of the first system subset included in report 216, those of the second system subset reported in message 226, and the results of the mathematical comparison between the system subsets, as generated by ratio calculator 217.

Figure 3:
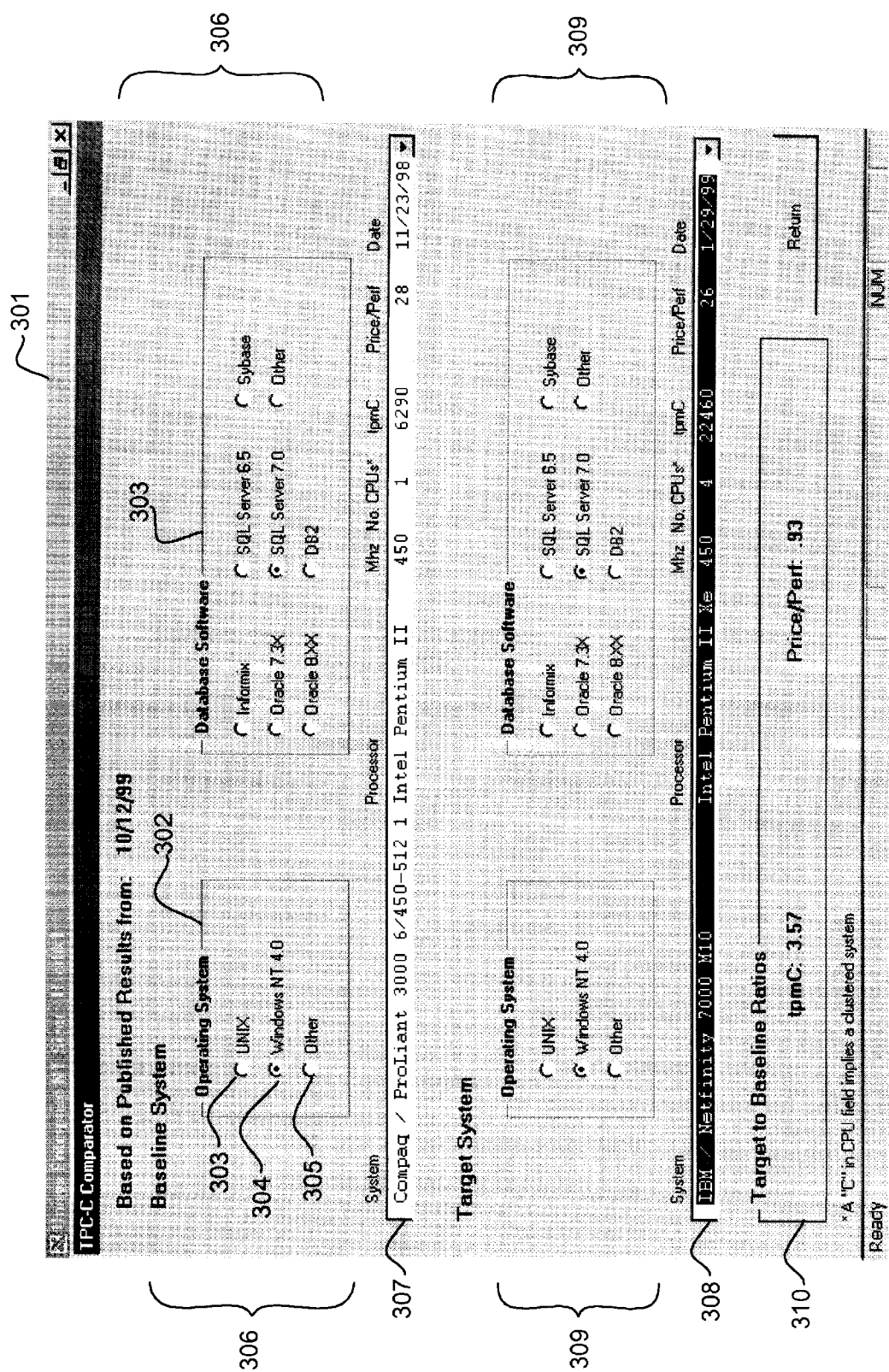
FIG. 3 is a screen-view of a preferred software embodiment of the present invention for analysis of Transaction Processing Council TPC-C data.

FIG. 3 shows a GUI screen shot of a preferred embodiment of the subject invention, as implemented using a software process. In this embodiment, the invention is configured to aid consideration of relational database computer system. The specifications which must be selected by a system planner are a hardware component (the server), a software component (the relational database system that will be considered), and an operating system component. In an alternate embodiment, the system planner may select a range of performance parameters such as processor speed, number of CPUs, amount of RAM, a certain range of transactions per minute, or other system specifications.

In the software embodiment of FIG. 3, the first presenter of the apparatus shown in FIG. 2 is embodied in the GUI by the array of radio buttons for operating system and database software 302 and 303, respectively. The system planner, a human user who is viewing the GUI display 301 of FIG. 3, selects a radio button for the operating system out of the operating system array 302, a component of the first presenter 306. Upon selection of radio button 303, 304, or 305, this radio button input is received by the first capturer, not a part of the GUI. The system planner also selects a database software package from the array 303 of the first presenter 306, and is shown an array of suitable systems for which relevant performance data exist by the second presenter 307. In this embodiment, the second presenter 307 is implemented by a GUI drop-down menu. In the embodiment shown, the first and second reporters display the first and second system performance reports in the drop down menu of the second and fourth presenters, 307 and 308, respectively.

The selection from the second presenter menu 307 is stored by the second capturer, and is presented to the second identifier, not visible to the user. A similar selection process is followed for the second system selection from presenters three 309 and four 308. Upon selection of a second system from the fourth presenter 308, the performance data comparison is displayed by the third reporter in a final system performance comparison report, shown at 310. The report may be viewed by the system planner on the computer monitor, or may be printed out for later reference and analysis.

In a preferred embodiment, the final performance report may be stored in a data file, for later consideration and compilation of various performance comparisons. Also in a preferred embodiment, the system performance fields of the first 306 and third 309 presenters, and the system subsets of the second 307 and fourth 308 presenters, may be selected and changed 'on the fly' by the system planner. In other words, the system planner may view the selected system subsets performance data reports and final system comparison reports without reinitiating the process of the invention or the software embodiment of the process, or entering a recalculate command. In this way, a human system planner may efficiently and conveniently consider any number of different computer systems, using various computer platform and software configurations, in a relatively short time. This may allow the system planner to harness the power of voluminous statistics to arrive at an overall comprehensive conclusion as to which system will best serve the needs of the system constituents.

Figure 4:
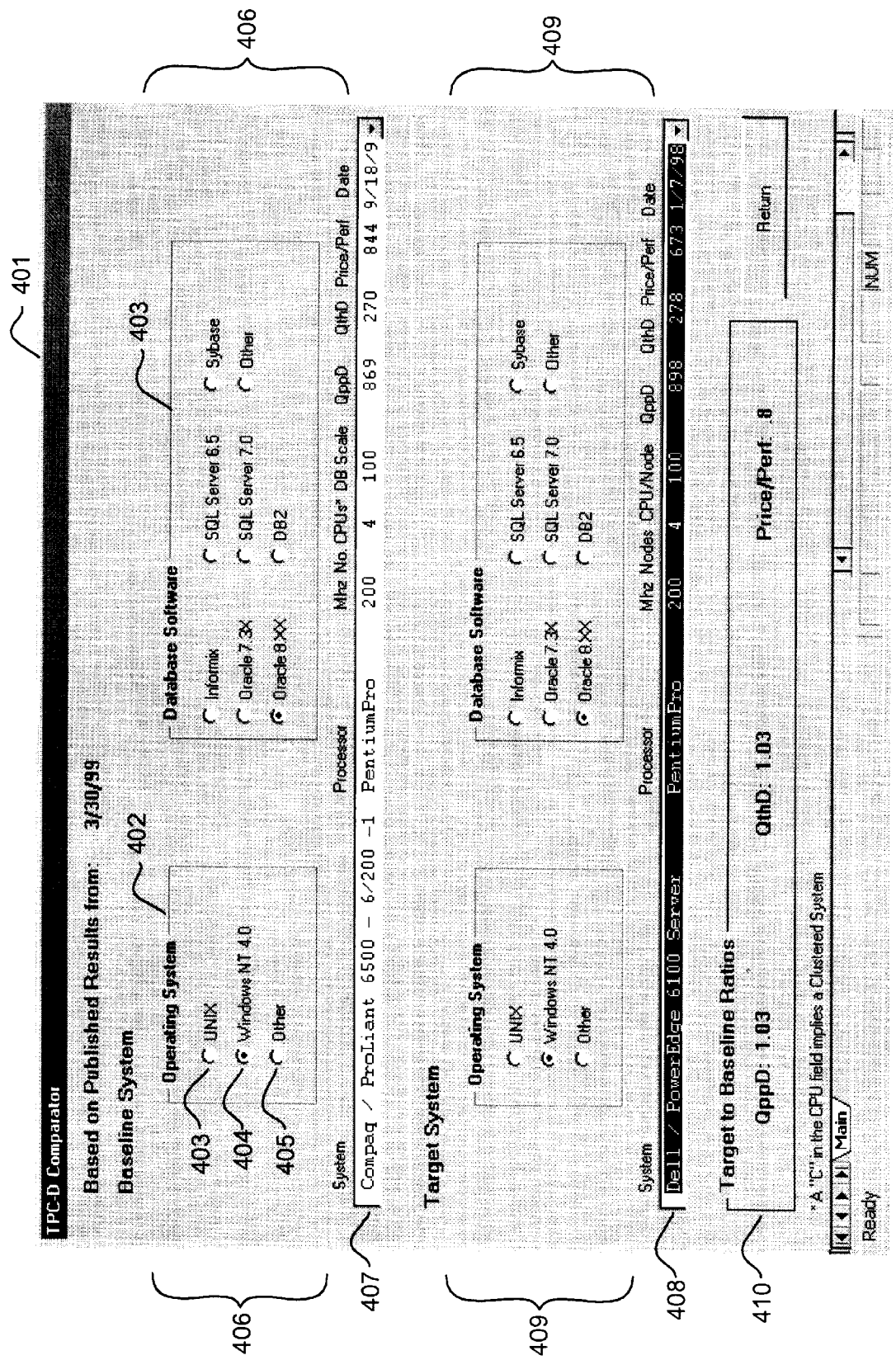
FIG. 4 is a screen shot of a preferred software embodiment of the present invention for analysis of Transaction Processing Council TPC-D data.

FIG. 4 is a screen shot of a software embodiment of the present invention, similar in layout to the TPC-C implementation of FIG. 3. The system planner may select a radio button for the operating system out of the operating system array 402. This input is received by the first capturer upon selection of radio button 403, 404, or 405. The system planner also selects a database software package from the first presenter 406, and is shown an array of suitable systems for which relevant performance data exist, by the second presenter 407. In the embodiment shown, the first and second reporters display the first and second system performance reports in the drop down menu of the second and fourth presenters, 407 and 408, respectively.

The selection from menu 407 is stored by the second capturer, and is presented to the second identifier, not visible to the user. A similar selection process is followed for the second system selection from presenters three 409 and four 408. Upon selection of a second system from the fourth presenter 408, the performance data comparison is displayed by the third reporter in a final system performance comparison report, shown at 410.

FIG. 5 shows an illustrative table 501 of a subset of the systems as listed in the Transaction Processing Council (TPC) TPC-C data. The systems are identified in the column 502, and a subset of the selection criteria or data headings are shown in columns generally indicated at 506. The data is shown in the order that the data is provided by the TPC, which is generally in alphabetical order by manufacturer in column 502.

In one embodiment, the data is provided by the TPC in the Microsoft Excel™ spreadsheet format. Using the features of Excel™, the data may be sorted, for example, according to the entries in any one of the rows. Preferably, the sorting is effected by running a macro or Visual Basic add-on using the capabilities of Microsoft Excel™. In a preferred embodiment, the Visual Basis add-on runs over Excel™ and provides a graphic user interface, such as shown in FIGS. 3 and 4.

Figure 6:
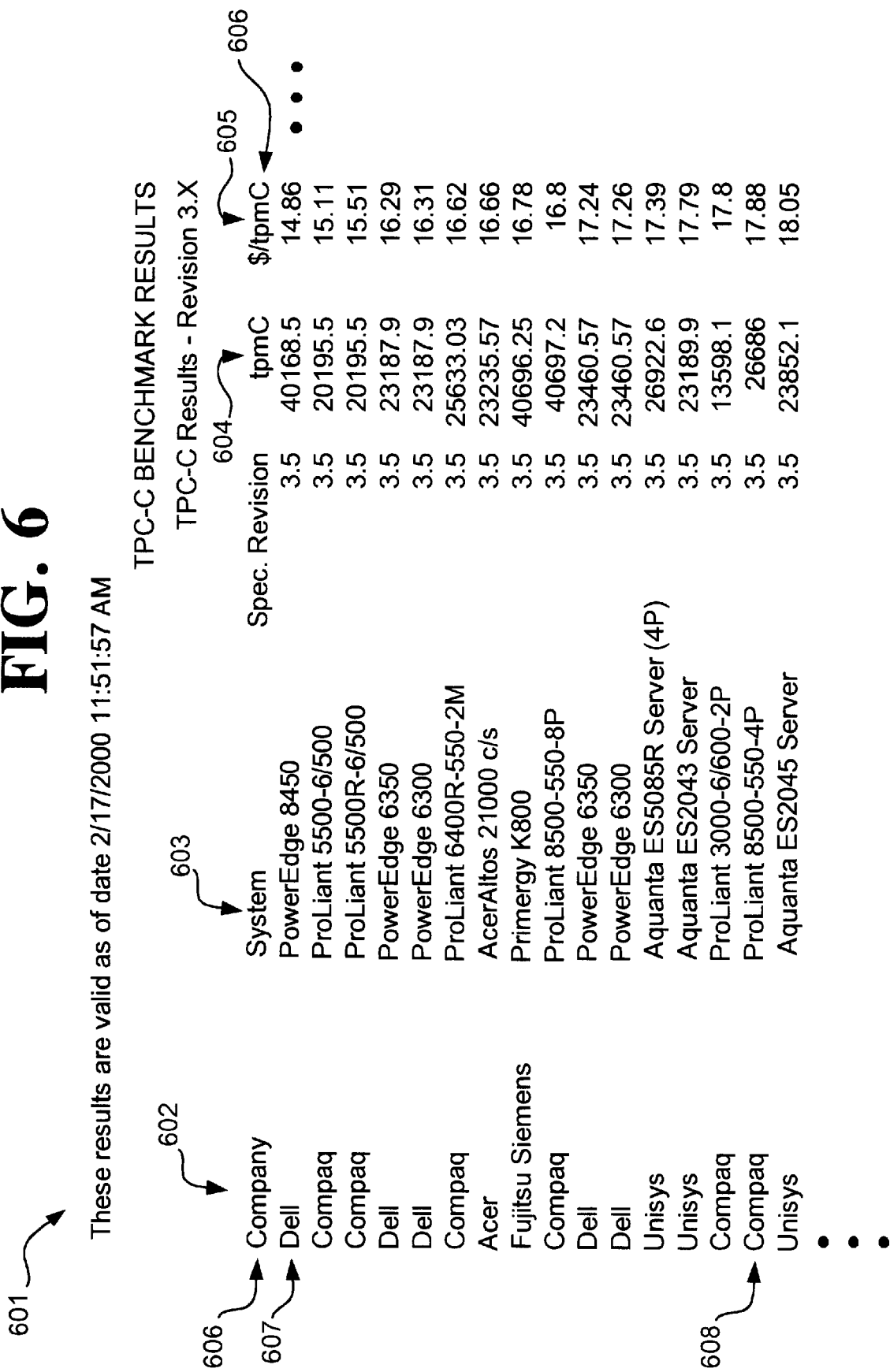
FIG. 6 is a table of a subset of the body of TPC data, sorted according to ascending cost per transactions per minute ($/tpmC).

FIG. 6 is a subset of the TPC-C raw data sorted according to ascending price per transactions per minute shown in column 605 (column 505 in FIG. 5). Because the illustrative sort was run on the entire body of TPC-C data, while only a subset of the raw data and results are shown, the members of the subsets are different. Using the sort on $/tpmC, a subset of the TPC-C systems are found within a certain range of $/tpmC. Thus, if a system planner wishes to consider only systems with a $/tpmC cost less than $18, a subset of systems could be returned from the TPC-C data from system 607 in FIG. 6 to system 608. These systems are the only systems for which TPC-C data exists that have a $/tpmC less than $18. In a preferred embodiment, the system planner could select the criteria (a $/tpmC less than $18) and receive a report of systems meeting this criteria, within the context of a GUI similar to that shown in FIGS. 3 and 4 and as described above.

In FIG. 2, the identifiers 210 and 227 may be implemented by sorting the TPC-C data according to this technique on criteria such as the operating system and/or database software (TPC-C criteria not shown in FIGS. 5 and 6). Thus, systems from the TPC-C data, a subset of which is shown by FIG. 5, may be sorted according to operating system and database software, with systems matching the system planner's selections being returned by identifiers 210 and 227 to the second and fourth presenters, 211 and 222, respectively.

In another illustrative embodiment, the TPC-D database may be considered. For example, instead of the transactions per minute metric of the TPC-C database, a performance variable called QppD@Size may be considered. Under this metric, the relative database size is used as a scale factor to determine the population of each table in the database. A scale factor (SF) of 1, for example, corresponds to about 1 GB of raw data.

$QppD@Size=[(3600*SF)/(Q_1*Q_2* \ldots *Q_{17})*UF1*UF2]^{1/19}$, where $Q_i$=Elapsed time to run query i within a single query stream; $UF_1$=Elapsed time to run update function 1; $UF_2$=Elapsed time to run update function 2; SF=Scaling Factor. The divisor of the equation represents the geometric mean of the timing intervals, i.e., the elapsed time to run the queries of the test, plus two update functions. Because the elapsed time entries into the metric are in seconds, the complete power metric QppD@Size has units of queries per hour.

The scale factor is unitless in the equation. The 3600 figure, also without units, converts the function per second of the geometric mean of the timing intervals into the queries per hour units of the QppD@Size metric. The throughput metric of the TPC-D benchmark database, QthD@Size, is the ratio of the number of queries executed to the length of the measurement interval in seconds: QthD@Size= (N*17*3600*SF)/L; where N=the number of query streams, and L=the length of the measurement interval in seconds. The units of the QthD@Size metric are queries per hour, adjusted for the scale factor, SF, to account for differences in database size.

Generally, both of these TPC-D parameters represent the number of queries that a hardware configuration can handle per gigabyte hour. Both the QppD@Size and the QthD@Size parameters are combined with system cost to provide the cost for a given level of throughput, measured as the geometric mean of both throughput parameters: $/QphD@Size=C/(QppD@Size*QthD@Size)^{1/2}$; where C=cost of system in dollars. It is contemplated that the present invention may be used to compare systems based on these TCP-D parameters, as well as other benchmark data.

Finally, it is contemplated that the invention may be used as a platform selection computer program. Under this embodiment, the user or system planner may enter a software application to be used, for example, in accessing and updating a relational database. The system planner may then select a particular relational database management system software application, for example, an application sold under the brand Oracle™. The subject invention, implemented in an illustrative embodiment as a computer program, may then solicit from the system planner the range of performance required for the computer system that the system planner is implementing. For example, the system planner could request a list of all benchmarked systems that perform at a certain minimum number of transactions per minute (tpmC) or above. In response, the invention may supply the system planner with a report of all computer hardware systems benchmarked in a particular database, and the operating systems used with the machines, that ran the Oracle™ application at least at the performance minimum set by the system planner.

In another illustrative embodiment, the system planner may simply input a minimum performance parameter, such as a maximum price of cost per transaction per minute ($/tpmC) under the TPC-C benchmark (TPC-C). In response, the invention may return a list of all database systems that meet the system planner's specified parameters. Other embodiments of the invention may allow the system planner to input an existing hardware system and selected required parameters. In response, the invention may identify those operating system and/or software application configurations that meet the required parameters.

Having thus described the preferred embodiments of the present invention, those of skill in the art will readily appreciate that the teachings found herein may be applied to yet other embodiments within the scope of the claims hereto attached.

What is claimed is:

1. A method for analysis of at least two computer systems, comprising the steps of:
   accepting from a system planner desired criteria for a system;
   accessing a database of computer systems wherein selected computer systems have performance characteristics, and finding those computer systems that meet the desired criteria;
   returning a list of computer systems that meet the desired criteria; and
   quantitatively comparing the performance characteristics of the returned computer systems.

2. The method of claim 1, wherein the criteria that are accepted include speed and cost-effectiveness intervals.

3. The method of claim 2, wherein the performance parameter intervals are defined by the system planner.

4. The method of claim 1, wherein the criteria that are accepted include operating system and software configurations.

5. A method for comparing computer systems, comprising the steps of:
   displaying an array of criteria options for a baseline system;
   selecting one or more of the criteria options for the baseline system;
   identifying from a performance database of performance parameters for various computer systems, a subset of computer systems that have performance data that meet the selected criteria;
   selecting one of the subset of computer systems as the baseline system;
   identifying from the performance database one or more performance parameters for the baseline system;
   displaying an array of criteria options for a target system;
   selecting one or more of the criteria options for the target system;
   identifying, from a performance database of performance parameters for various computer systems, a subset of computer systems that have performance data that meet the selected criteria;
   selecting one of the subset of computer systems as the target system;
   identifying, from the performance database, one or more performance parameters for the target system; and
   calculating ratios of the one or more performance parameter of the baseline system to the respective performance parameter of the target system.

6. The method of claim 5, further comprising the step of outputting to the system planner, in a performance ratio report, the ratios of the performance parameters of the baseline system to those of the target system.

7. The method for comparison of computer systems of claim 5, wherein the system specifications to be selected by the system planner comprise speed and cost-effectiveness minimum requirements.

8. The method for comparison of computer systems of claim 7, wherein the system specifications to be selected by the system planner comprise speed and cost-effectiveness minimum requirements specifications.

9. The method for comparison of computer systems of claim 5, wherein the system criteria to be selected by the system planner comprise the operating system of the computer systems to be considered.

10. The method for comparison of computer systems of claim 5, wherein the system criteria to be selected by the system planner comprise one or more software applications to be run on the computer systems to be considered.

11. The method of claim 10, wherein the one or more software applications include database management software.

12. The method for comparison of computer systems of claim 5, wherein the system criteria to be selected by the system planner comprise the manufacturer of the computer systems to be considered.

13. The method of claim 5, wherein the computer systems presented to the system planner for selection comprise client-server computer systems.

14. The method of claim 5 embodied in executable computer code stored on media capable of being read by a computer system.

15. The method of claim 5, wherein the performance parameters returned for the selected systems comprise performance information according to an on-line transaction processing benchmark.

16. The method of claim 15, wherein the performance parameters returned for the selected systems comprise the Transaction Processing Council TPC-C benchmark.

17. The method of claim 15, wherein the performance parameters returned for the selected systems comprise a decision support database performance metric benchmark.

18. The method of claim 17, wherein the performance parameters returned for the selected system comprise fields from the TPC-D benchmark.

19. The method of claim 17, wherein the TPC-D Power Metric Geometric Mean performance parameter is compared between systems.

20. The method of claim 17, wherein the TPC-D Arithmetic Mean performance parameter is compared between systems.

21. The method of claim 17, wherein the TPC-D Load Test performance parameter is compared between systems.

22. The method of claim 5, wherein the method is implemented as executable computer code.

23. The method of claim 22, wherein the application comprises code running as a script or macro within another application.

24. The method of claim 23, wherein the application environment into which the script is built comprises a spreadsheet application.

25. The method of claim 23, wherein the both steps of identifying from a performance database of performance parameters for various computer systems, a subset of computer systems that have performance data that meet the selected criteria; is implemented by sorting the performance database according to the selected criteria.

26. The method of claim 5, wherein the performance parameters returned for the systems comprise a parameter for the number of transactions executed per unit of time.

27. The method of claim 5, wherein the performance parameters returned for the systems comprise a parameter for the cost per number of transactions executed per unit of time.

28. The method of claim 5, wherein the performance parameters comprise fields from the Transaction Processing Council Benchmarks TPC-H or TPC-R.

29. An apparatus for comparison of the performance or cost-effectiveness of different computer systems for a particular software application, comprising:
- a first acceptor, which takes from a system planner input of components for a baseline computer system as a basis for analysis, comprising:
  - a first presenter which communicates to the system planner an array of specifications for selection as the hypothetical specifications for a baseline system;
  - a first capturer that accepts as input the system planner's specification selections for the baseline system;
  - a first identifier that consults a performance database of performance parameters for various complete computer systems, returning those hardware systems which have performance data matching the system planner's specifications for the baseline system;
  - a second presenter that communicates to the system planner an array of hardware systems matching the system planner's specifications, as choices for the baseline system;
  - a second capturer that accepts as input the system planner's hardware system selection for the baseline system;
  - a second identifier, that returns from a performance database of performance parameters, the performance parameters for the baseline system selected by the system planner;
  - a first reporter, that outputs to the system planner, in a performance ratio report, the performance parameters of the selected baseline system;
- a second acceptor, which takes from a system planner input of components for a target system as a basis for analysis, comprising the steps of:
- a third presenter which communicates to the system planner an array of specifications for selection as the hypothetical specifications for a target system;
- a third capturer that accepts as input the system planner's specification selections for the target system;
- a third identifier that consults a performance database of performance parameters for various complete computer systems, returning those hardware systems which have performance data matching the system planner's specifications for the baseline system;
- a fourth presenter that communicates to the system planner an array of hardware systems matching the system planner's specifications, as choices for the target system;
- a fourth capturer that accepts as input the system planner's hardware system selection for the target system;
- a fourth identifier, that returns from a performance database of performance parameters, the performance parameters for the target system selected by the system planner;
- a second reporter, that outputs to the system planner, in said performance ratio report, the performance parameters of the selected target system;
- a ratio calculator that computes ratios of each performance parameter of the baseline system to each respective performance parameter of the target system; and
- a third reporter that outputs to the system planner, in the performance ratio report, the ratios of the performance parameters of the baseline system to the respective performance parameters of the target system.

* * * * *